United States Patent
Kim et al.

(10) Patent No.: US 10,285,066 B2
(45) Date of Patent: May 7, 2019

(54) VHT FRAME INCLUDING SPATIAL REUSE PARAMETER IN HE WLAN

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 45 days.

(21) Appl. No.: 15/471,932

(22) Filed: Mar. 28, 2017

(65) Prior Publication Data

US 2017/0289819 A1 Oct. 5, 2017

Related U.S. Application Data

(60) Provisional application No. 62/314,971, filed on Mar. 29, 2016.

(51) Int. Cl.
| | |
|---|---|
| *H04W 84/12* | (2009.01) |
| *H04W 16/14* | (2009.01) |
| *H04W 52/28* | (2009.01) |
| *H04W 52/38* | (2009.01) |
| *H04W 74/08* | (2009.01) |
| *H04W 74/00* | (2009.01) |

(52) U.S. Cl.
CPC .......... *H04W 16/14* (2013.01); *H04W 52/286* (2013.01); *H04W 52/383* (2013.01); *H04W 74/0808* (2013.01); *H04W 74/002* (2013.01); *H04W 84/12* (2013.01)

(58) Field of Classification Search
CPC .................................................. H04W 84/12
See application file for complete search history.

(56) References Cited

U.S. PATENT DOCUMENTS

2017/0142659 A1* 5/2017 Noh .................. H04W 52/0245

OTHER PUBLICATIONS

Gast, Matthew, 802.11ac: A survival guide, Aug. 2013.*
Du, Yongjiu, et al, SAMU: Design and Implementation of Selectivity-Aware MU-MIMO for Wideband WiFi, Jun. 2015.*

* cited by examiner

*Primary Examiner* — Kent K Krueger
(74) *Attorney, Agent, or Firm* — Lee Hong Degerman Kang Waimey

(57) ABSTRACT

A method for a STA (Station) to transmit a frame to another STA is disclosed. The method includes preparing a VHT (Very High Throughput) frame including a first signaling field (VHT SIG A), a second signaling field (VHT SIG B) and a service field. One of the VHT SIG A, the VHT SIG B and the service field includes a subfield informing spatial reuse (SR) operation when the STA is capable to supporting HE (High Efficiency) WLAN (Wireless Local Area Network) scheme.

10 Claims, 8 Drawing Sheets

FIG. 6

| RATE (4 bits) | | | | | LENGTH (12 bits) | | | | | | | | | | | | | SIGNAL TAIL (6 bits) | | | | | |
|---|---|---|---|---|---|---|---|---|---|---|---|---|---|---|---|---|---|---|---|---|---|---|---|
| R1 | R2 | R3 | R4 | R | LSB | | | | | | | | | | | MSB | P | "0" | "0" | "0" | "0" | "0" | "0" |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

Transmit Order

FIG. 7

| Scrambler Initialization | | | | | | | Reserved SERVICE Bits | | | | | | | | |
|---|---|---|---|---|---|---|---|---|---|---|---|---|---|---|---|
| "0" | "0" | "0" | "0" | "0" | "0" | "0" | R | R | R | R | R | R | R | R | R |
| 0 | 1 | 2 | 3 | 4 | 5 | 6 | 7 | 8 | 9 | 10 | 11 | 12 | 13 | 14 | 15 |

Transmit Order

FIG. 8

| | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name: | BW | Reserved | STBC | Group ID | NSTS/Partial AID | | | | TXOP PS NOT ALLOWED | Reserved |
| SU Name: | BW | Reserved | STBC | Group ID | SU NSTS | Partial AID | | | TXOP PS NOT ALLOWED | Reserved |
| MU Name: | BW | Reserved | STBC | Group ID | MU[0] NSTS | MU[1] NSTS | MU[2] NSTS | MU[3] NSTS | TXOP PS NOT ALLOWED | Reserved |
| Bits: | 2 | 1 | 1 | 6 | 3 | 3 | 3 | 3 | 1 | 1 |

(a)

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | Short GI | Short GI NSYM Disambiguation | SU/MU[0] Coding | LDPC Extra OFDM symbol | SU VHT-MCS | | | | Beam-formed | Reserved | CRC | Tail |
| MU Name: | Short GI | Short GI NSYM Disambiguation | SU/MU[0] Coding | LDPC Extra OFDM symbol | MU[1] Coding | MU[2] Coding | MU[3] Coding | Reserved | Reserved | Reserved | CRC | Tail |
| Bits: | 1 | 1 | 1 | 1 | 1 | 1 | 1 | 1 | 1 | 1 | 8 | 6 |

VHT FRAME INCLUDING SPATIAL REUSE PARAMETER IN HE WLAN

CROSS REFERENCE TO RELATED APPLICATIONS

Pursuant to 35 U.S.C. § 119(e), this application claims the benefit of U.S. Provisional Patent Application No. 62/314,971, filed on Mar. 29, 2016, the contents of which are hereby incorporated by reference herein in its entirety.

BACKGROUND OF THE INVENTION

Field of the Invention

The present invention relates to a method and apparatus for transmitting VHT (Very High Throughput) frame including spatial reuse parameter in HE (High Efficiency) WLAN (Wireless Local Area Network).

Discussion of the Related Art

Standards for WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

The station (STA) capable of supporting IEEE 802.11n is officially called as HT (High Throughput) STA. The STA capable of supporting IEEE 802.11ac is officially called as VHT (Very High Throughput) STA. And, the STA capable of supporting IEEE 802.11ax is officially called as HE (High Efficiency) STA.

SUMMARY OF THE INVENTION

In IEEE 802.11ax, Spatial Reuse (SR) operation is one of the key issues. The objective of the HE spatial reuse operation is to improve the system level performance and the utilization of the spectrum resources in dense deployment scenarios by early identification of signals from overlapping basic service sets (OBSSs) and interference management Thus, HE frame shall be designed to include parameters or information for SR operation.

However, HE STA should support legacy STAs communicating based on VHT frames that do not have SR parameter or information.

Present invention is for communication scheme based on VHT frame efficiently including SR parameters in HE WLAN.

To achieve these objects and other advantages and in accordance with the purpose of the invention, as embodied and broadly described herein, a method for a STA (Station) to transmit a frame to another STA, the method comprising: preparing, at the STA, a VHT (Very High Throughput) frame including a first signaling field (VHT SIG A), a second signaling field (VHT SIG B) and a service field, wherein one of the VHT SIG A, the VHT SIG B and the service field includes a subfield informing spatial reuse (SR) operation when the STA is capable to supporting HE (High Efficiency) WLAN (Wireless Local Area Network) scheme; and transmitting the VHT frame to another STA, is proposed.

The subfield informing SR operation may be used for adaptive CCA (Clear Channel Assessment) operation or power control based on the determination that the VHT frame is from inter-BSS (Basic Service Set) or intra-BSS.

The one of the VHT SIG A, the VHT SIG B and the service field may include the subfield informing SR operation when the VHT frame is a downlink frame.

The VHT SIG A may include the subfield informing SR operation with a length of 3 bits, wherein the 3 bits are consisting of: a third bit and $24^{th}$ bit of a first part of VHT SIG A (VHT SIG A1), and a $10^{th}$ bit of a second part of VHT-SIG A (VHT SIG A2), and wherein one of values of the subfield indicates SR operation is disallowed while the other values of the subfield indicates respective parameter values for SP operation.

The VHT SIG A may include the subfield informing SR operation with a length of 2 bits, wherein the 2 bits are selected as two among: a third bit and $24^{th}$ bit of a first part of VHT SIG A (VHT SIG A1), and a $10^{th}$ bit of a second part of VHT-SIG A (VHT SIG A2), and wherein one of values of the subfield indicates SR operation is disallowed while the other values of the subfield indicates respective parameter values for SP operation.

The VHT SIG A may include the subfield informing SR operation with a length of 1 bit, wherein the 1 bit is selected as one among: a third bit and $24^{th}$ bit of a first part of VHT SIG A (VHT SIG A1), and a $10^{th}$ bit of a second part of VHT-SIG A (VHT SIG A2), and wherein one of values of the subfield indicates SR operation is disallowed while the other value of the subfield indicates fixed SR parameter value.

The VHT SIG B may include the subfield informing SR operation, and wherein one of values of the subfield indicates SR operation is disallowed while the other value or values of the subfield indicates SR parameter value.

The VHT SIG A may include indicator informing whether the VHT SIG B includes the subfield informing SR operation. Here, the service field may include the subfield informing SR operation, and wherein a part of the scrambling initialization subfield of the service may be used for the subfield informing SR operation.

In another aspect of the present invention, a STA (Station) adapted to transmit a frame to another STA, the STA comprising: a processor configured to prepare a VHT (Very High Throughput) frame including a first signaling field (VHT SIG A), a second signaling field (VHT SIG B) and a service field, wherein one of the VHT SIG A, the VHT SIG B and the service field includes a subfield informing spatial reuse (SR) operation when the STA is capable to supporting HE (High Efficiency) WLAN (Wireless Local Area Network) scheme; and a transceiver configured to transmit the VHT frame to another STA, is provided.

The subfield informing SR operation may be used for adaptive CCA (Clear Channel Assessment) operation or power control based on the determination that the VHT frame is from inter-BSS (Basic Service Set) or intra-BSS.

The processor may include the subfield informing SR operation in the one of the VHT SIG A, the VHT SIG B and the service field when the VHT frame is a downlink frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

In FIG. 3, an exemplary infrastructure BSS including a DS is illustrated.

FIGS. 4 to 8 illustrate exemplary frame structures used in an Institute of Electrical and Electronics Engineers (IEEE) 802.11 system.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description is given for communication based on VHT frame including SR parameter in HE WLAN. For this purpose, a WLAN system to which the present invention is applied will first be described.

Figure 1:
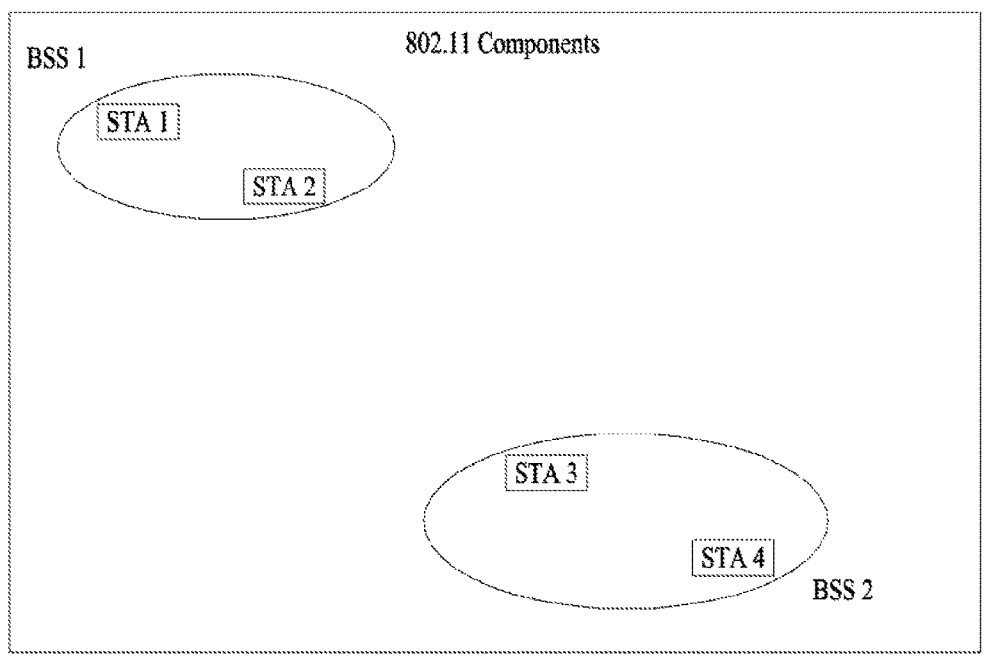
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
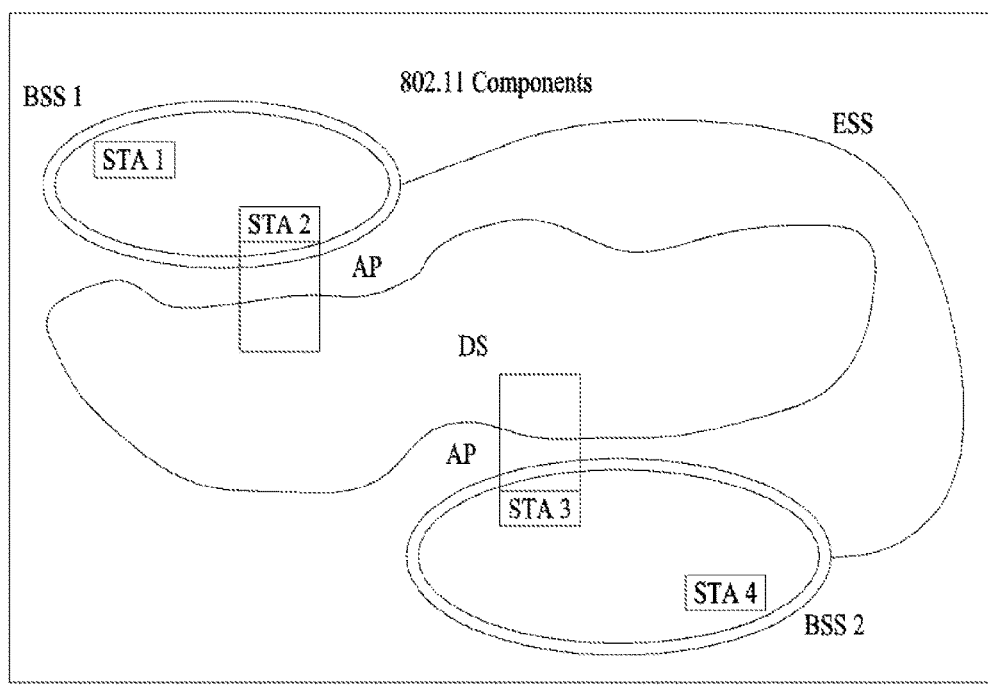
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
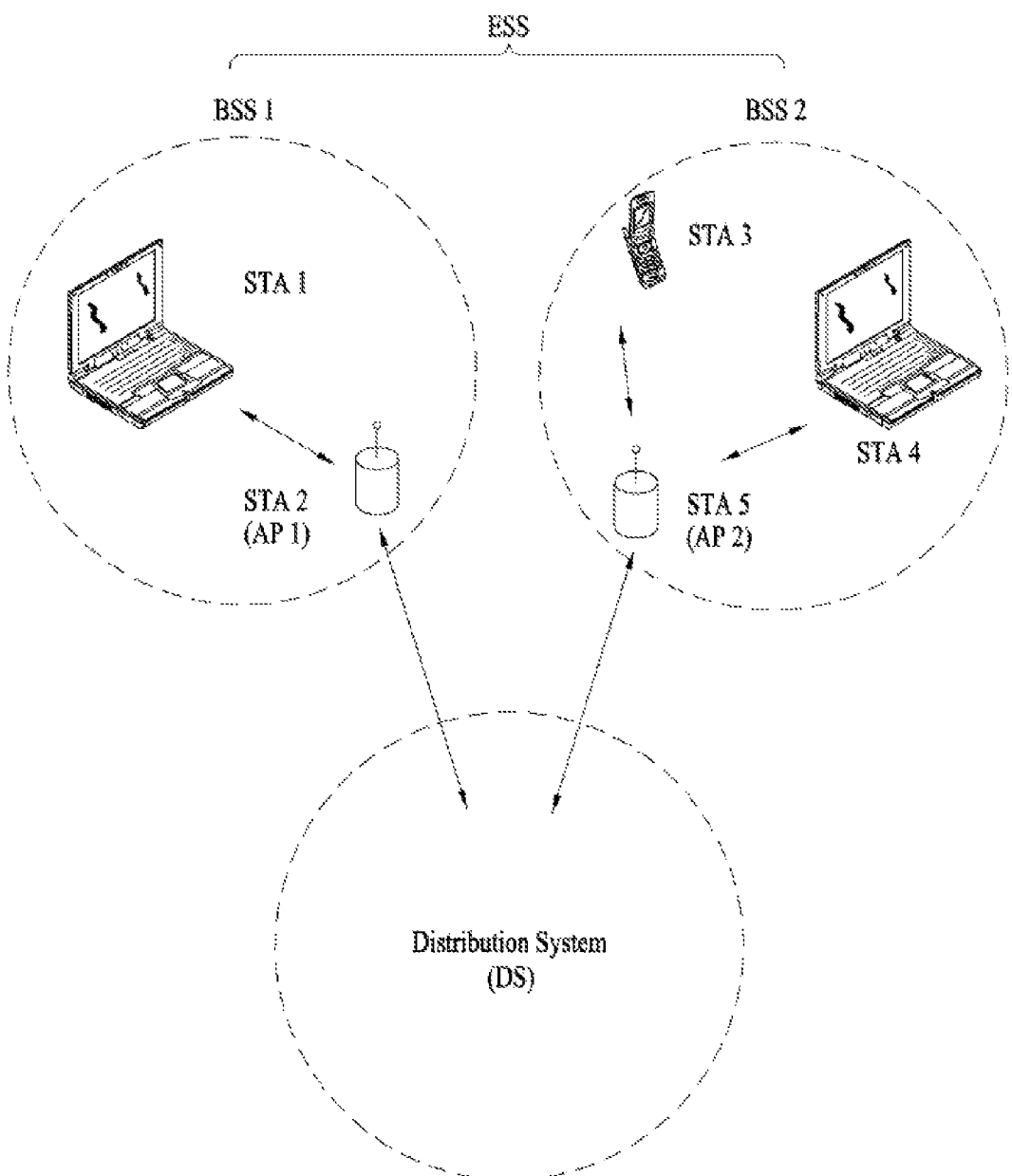
FIG. 3 illustrates an exemplary configuration of a WLAN system.
Figure 4:
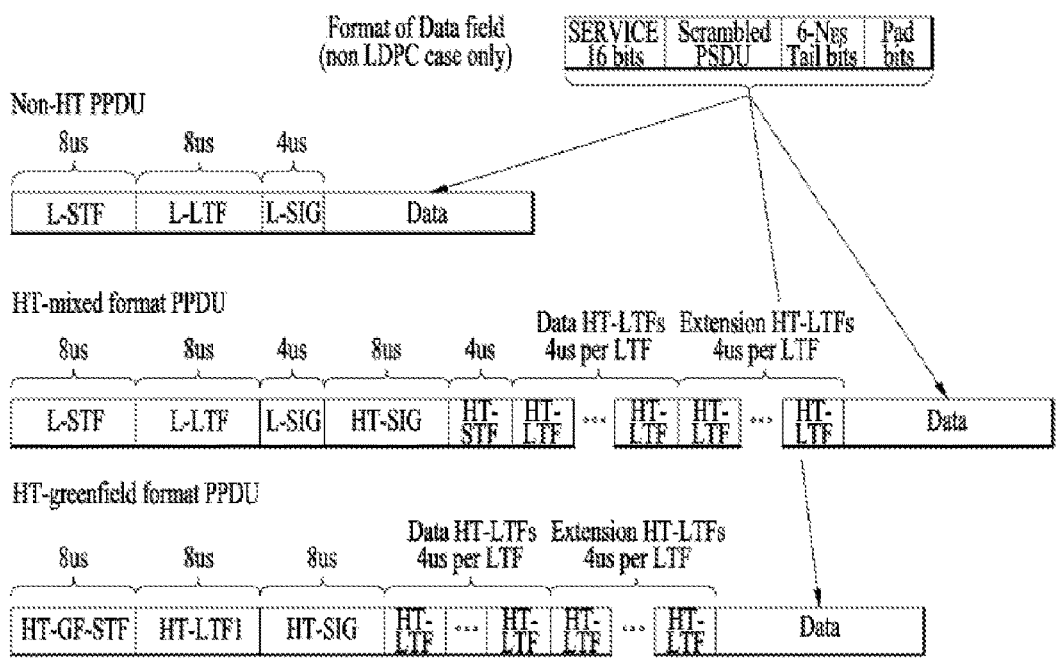

FIG. 3 illustrates an exemplary configuration of a WLAN system. In FIG. 3, an exemplary infrastructure BSS including a DS is illustrated.

In the example of FIG. 3, an ESS includes BSS1 and BSS2. In the WLAN system, an STA is a device complying with Medium Access Control/Physical (MAC/PHY) regulations of Institute of Electrical and Electronics Engineers (IEEE) 802.11. STAs are categorized into AP STAs and non-AP STAs. The non-AP STAs are devices handled directly by users, such as laptop computers and mobile phones. In FIG. 3, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Various Frame Structure

FIGS. 4 to 8 illustrate exemplary frame structures used in an Institute of Electrical and Electronics Engineers (IEEE) 802.11 system.

An STA may receive a PLCP Protocol Data Unit (PPDU). A PPDU frame may be formatted to include a Short Training Field (STF), a Long Training Field (LTF), a SIGNAL (SIG) field, and a Data field. For example, a PPDU frame format may be configured based on the type of the PPDU frame format.

For example, a non-High Throughput (non-HT) PPDU format may include only a Legacy-STF (L-STF), a Legacy-LTF (L-LTF), a SIG field, and a Data field.

The PPDU frame format type may be configured to be one of a HT-mixed format PPDU and an HT-greenfield format PPDU. The above-described PPDU format may further include an additional STF (or an STF of a different type), an additional LTF (or an LTF of a different type), and an additional SIG field (or a SIG field of a different type) between the SIG field and the Data field.

Figure 5:
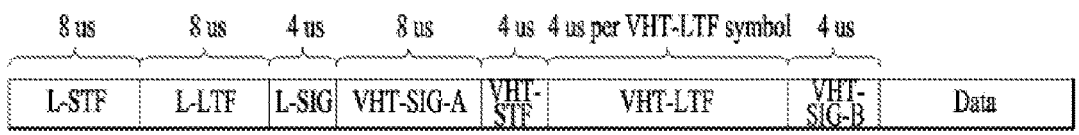

Referring to FIG. 5, a Very High Throughput (VHT) PPDU format may be configured. The VHT PPDU format may also include an additional STF (or an STF of a different type), an additional LTF (or an LTF of a different type), and an additional SIG field (or a SIG field of a different type) between the SIG field and the Data field. More specifically, at least one of a VHT-SIG-A field, a VHT-STF, a VHT-LTF, and a VHT SIG-B field may further be included between an L-SIG field and the Data field in the VHT PPDU format.

An STF may be a signal used for Automatic Gain Control (AGC), diversity selection, accurate time synchronization, etc. The STF and the LTF may be collectively referred to as a Physical Layer Convergence Protocol (PLCP) preamble, and the PLCP preamble may be a signal used for synchronization and channel estimation of an OFDM physical layer.

Referring to FIG. 6, the SIG field may include a RATE field and a LENGTH field. The RATE field may include information about modulation and a coding rate of data. The LENGTH field may include information about the length of the data. Additionally, the SIG field may include parity bits, and SIG Tail bits.

The Data field may include a SERVICE field, a PLCP Service DATA Unit (PSDU), and PPDU TAIL bits. When needed, the Data field may also include padding bits.

Referring to FIG. 7, a part of bits of the SERVICE field may be used for synchronization of a descrambler in a receiver, and another part of the bits of the SERVICE field may be reserved. The PSDU may correspond to a MAC Protocol Data Unit (PDU) defined at the MAC layer and include data generated/used by a higher layer. The PPDU TAIL bits may be used to return an encoder to a zero state. The padding bits may be used to match the length of the Data field to a predetermined unit.

As described before, for example, the VHT PPDU format may include an additional STF (or an STF of a different type), an additional LTF (or an LTF of a different type), and an additional SIG field (or a SIG field of a different type). The L-STF, the L-LTF, and the L-SIG may be a part for non-VHT in the VHT PPDU, and the VHT-SIG-A, the VHT-STF, the VHT-LTF, and the VHT-SIG-B may be a part for VHT. In other words, an area for non-VHT fields and an area for VHT fields may be separately defined in the VHT PPDU. For example, the VHT-SIG-A may include information for interpreting the VHT PPDU.

Referring to FIG. 8, for example, the VHT-SIG-A may include VHT SIG-A1 (FIG. 8(a)) and VHT SIG-A2 (FIG. 8(b)). Each of the VHT SIG-A1 and the VHT SIG-A2 may have 24 data bits, and the VHT-SIG A1 may precede the VHT-SIG A2. The VHT-SIG-A1 may include a Bandwidth (BW) field, a Space Time Block Coding (STBC) field, a Group Identifier (ID) field, a Number of Space-Time Streams (NSTS)/Partial Association ID (Partial AID) field, a TXOP_PS_NOT_ALLOWED field, and a Reserved field. The VHT SIG-A2 may include a Short Guard Interval (GI) field, a Short GI NSYM Disambiguation field, a Single User (SU)/Multi-User (MU)[0] Coding field, a Low Density Parity Check (LDPC) Extra OFDM Symbol field, an SU VHT-Modulation Coding Scheme (MCS)/MU[1-3] Coding field, a Beamformed field, a Cyclic Redundancy Check (CRC), a Tail, and a Reserved field. Information about the VHT PPDU may be acquired from the VHT SIG-A1 and the VHT SIG-A2.

Coexistence

In HE WLAN, there is a need for coexistence in dense environment. This section describes features that improve overlapping BSS (OBSS) operation in dense environments. This includes features such as deferral rules and CCA levels.

The STA determines whether the detected frame is an inter-BSS or an intra-BSS frame by using BSS color or MAC address in the MAC header. If the detected frame is an inter-BSS frame, under specific condition, uses OBSS PD level that is greater than the minimum receive sensitivity level.

A STA is preferred to regard an Inter-BSS PPDU with a valid PHY header and that has a receive power/RSSI below the OBSS PD level used by the receiving STA and that meets additional specific conditions, as not having been received at all (e.g., should not update its NAV), except that the medium condition shall indicate BUSY during the period of time that is taken by the receiving STA to validate that the PPDU is from an Inter-BSS, but not longer than the time indicated as the length of the PPDU payload. The OBSS PD level is greater than the minimum receive sensitivity level.

The amendment shall include one or more mechanisms to improve spatial reuse by allowing adjustments to one or more of the CCA-ED, 802.11 Signal Detect CCA, OBSS_PD or TXPWR threshold values. The constraints on selecting threshold values are to be determined.

The specification to consider a procedure that may revise the NAV depending on specific conditions at the recipient of the ongoing OBSS frame.

An 11ax STA regards a valid OBSS PPDU as not having been received at all (e.g., should not update its NAV), except that the medium condition shall indicate BUSY during the period of time that is taken by the receiving STA to validate that the PPDU is from an Inter-BSS, but not longer than the time indicated as the length of the PPDU payload if the RXPWR of the received PPDU is below the OBSS_PD threshold and specific conditions are met, noting that the OBSS_PD threshold is accompanied by a TXPWR value following adjustment rules:

Adjustment Rule for OBSS_PD $$OBSS\_PD_{Threshold} = \max\begin{bmatrix} OBSS\_PD_{threshold\_min} \\ OBSS\_PD_{threshold\_max} \\ \min(OBSS\_PD_{threshold\_min} + (TX\_PWR_{ref} - TX\_PWR)) \end{bmatrix}$$ [Equation 1]

where $TX\_PWR_{ref}$ is an absolute *reference power level*.

$$OBSS\_PD_{Thresholdmax} =$$
$$OBSS\_PD_{Thresholdmax}(20 \text{ MHz}) + 10^* \log\left(\frac{BW}{20 \text{ MHz}}\right)$$

$$OBSS\_PD_{Thresholdmin} =$$
$$OBSS\_PD_{Thresholdmin}(20 \text{ MHz}) + 10^* \log\left(\frac{BW}{20 \text{ MHz}}\right)$$

Preserves fairness for the lower power devices
$TX\_PWR_{ref}$ can be a TED level (preferred value is 23 dBm)
Class A: TX_PWR=transmit power
Class B: TX_PWR=transmit power+TBD dB An HE STA preferred to have a mechanism to remember and distinguish NAVs set by intra-BSS frame and OBSS frame. A CF-end frame that comes from intra-BSS should not reset NAV that was set by a frame from OBSS. To determine which BSS is the origin of a frame, the HE STA may use BSS color.

Spatial Reuse Operation—General

The objective of the HE spatial reuse operation is to improve the system level performance and the utilization of the spectrum resources in dense deployment scenarios by early identification of signals from overlapping basic service sets (OBSSs) and interference management.

A. Color Code Based CCA Rules

An STA determines whether a detected frame is an inter-BSS or an intra-BSS frame by using BSS color or MAC address in the MAC header. The detected frame is intra-BSS frame if one of the following conditions is true:

(1) The BSS color in the detected PPDU is same as the BSS color announced by its associated AP, (2) The RA or TA of the detected frame is same as the BSSID or its bandwidth signalling variant of its associated AP (3) Its associated AP is identified by TBD Multiple BSSID element and the RA or TA of the detected frame is same as one of the BSSID or its bandwidth signalling variant defined by TBD Multiple BSSID element.

If the detected frame is an inter-BSS frame, under specific condition, uses OBSS PD level that is greater than the minimum receives sensitivity level.

A STA sis preferred to regard an inter-BSS PPDU with a valid PHY header and that has receiving power/RSSI below the OBSS PD level used by the receiving STA and that meets additional TBD conditions, as not having been received at all (e.g., should not update its NAV), except that the medium condition shall indicate BUSY during the period of time that is taken by the receiving STA to validate that the PPDU is from an inter-BSS, but not longer than the time indicated as the length of the PPDU payload.

A STA is preferred to revise the NAV depending on specific conditions at the recipient of the ongoing OBSS frame.

B. Adaptive CCA and Transmit Power Control

When the color code based CCA rule is used, an HE STA is allowed to adjust the OBSS_PD threshold in conjunction with transmit power control to improve the system level performance and the utilization of the spectrum resources.

To further improve the possibilities of spatial reuse, an STA is allowed to adjust the setting of one or more following parameters, CCA ED level, 802.11 signal detect CCA or TXPWR threshold values.

Means for SR Operations

In order to perform the above SR operation, HE WLAN is to use the followings.

A. HE-SIG-A

The HE-SIG-A field carries information required to interpret HE PPDUs. The structure of the HE-SIG-A field for the first part (HE-SIG-A1) and for the second part (HE-SIG-A2) is still in discussion. But, the HE-SIG-A field for an HE SU PPDU or an HE extended range SU PPDU is proposed to contain the fields.

TABLE 1

| Two Parts of HE-SIG-A | Bit | Field | Number of bits | Description |
|---|---|---|---|---|
| TBD | TBD | DL/UL | 1 | Indicates whether the PPDU is sent UL or DL. This field indicates DL for TDLS. NOTE-The TDLS peer can identify the TDLS frame by To DS and From DS fields in the MAC header of the MPDU. |
| | TBD | Format | 1 | Differentiate between an HE SU PPDU and an HE trigger-based PPDU or between an HE extended range SU PPDU and an HE trigger-based PPDU |
| | TBD | BSS Color | 6 | The BSS Color field is an identifier of the BSS |
| | TBD | Spatial Reuse | TBD | TBD |
| | TBD | TXOP Duration | TBD | Indicates the remaining time in the current TXOP. Details TBD. |
| | TBD | Bandwidth | 2 | Set to 0 for 20 MHz, 1 for 40 MHz, 2 for 80 MHz, 3 for 160 MHz and 80 + 80 MHz |
| | TBD | MCS | 4 | HE-MCS index |
| | TBD | CP + LTF Size | 3 | To indicate the CP length and HE-LTF size, the current combinations are 1x HE-LTF + 0.8 µs, 2x HE-LTF + 0.8 µs, 2x HE-LTF + 1.6 µs and 4x HE-LTF + 3.2 µs. Other combinations are TBD. |
| | TBD | Coding | 2 | Indication of BCC/LDPC and presence of the extra OFDM symbol for LDPC. Detailed indication is TBD |
| | TBD | Nsts | 3 | Indicates the number of spatial streams: Set to 0 for 1 space time stream Set to 1 for 2 space time streams Set to 2 for 3 space time streams Set to 3 for 4 space time streams Set to 4 for 5 space time streams Set to 5 for 6 space time streams Set to 6 for 7 space time streams Set to 7 for 8 space time streams |
| | TBD | STBC | 1 | Set to 1 if space time block coding is used and set to 0 otherwise. |
| | TBD | TxBF | 1 | Set to 1 if a Beamforming steering matrix is applied to the waveform in an SU transmission, set to 0 otherwise. |
| | TBD | DCM | 1 | Set to 1 indicates that the payload of the SU PPDU is modulated with dual sub-carrier modulation for the MCS. Set to 0 indicates that the payload of the PPDU is not modulated with dual sub-carrier modulation for the MCS. |

TABLE 1-continued

| Two Parts of HE-SIG-A | Bit | Field | Number of bits | Description |
|---|---|---|---|---|
| | TBD | Packet Extension | 3 | The first two bits indicate the "a-factor" and the third bit indicates the PE-Disambiguity. |
| | TBD | Beam Change | 1 | Set to 1 indicates that the pre-HE-STF portion of the SU PPDU is spatially mapped differently from HE-LTF1. Set to 0 indicates that the pre-HE-STF portion of the SU PPDU is spatially mapped the same way as HE-LTF1 on each tone. |
| | TBD | CRC | 4 | CRC of bits 0-41 in HT-SIG-A. |
| | TBD | Tail | 6 | Used to terminate the trellis of the convolutional decoder. Set to 0. |

The HE-SIG-A field of an HE MU PPDU contains the fields listed in Table 2.

TABLE 2

| Two Parts of HE-SIG-A | Bit | Field | Number of Bits | Description |
|---|---|---|---|---|
| TBD | TBD | DL/UL | 1 | Indicates whether the HE MU PPDU is UL or DL. This field indicates DL for TDLS. NOTE-The TDLS peer can identify the TDLS frame by To DS and From DS fields in the MAC header of the 11ax MPDU. |
| | TBD | BSS Color | 6 | The BSS Color field is an identifier of the BSS |
| | TBD | Spatial Reuse | TBD | TBD |
| | TBD | TXOP Duration | TBD | Indicates the remaining time in the current TXOP. Details TBD. |
| | TBD | Bandwidth | ≥2 | Set to 0 for 20 MHz, 1 for 40 MHz, 2 for 80 MHz, 3 for 160 MHz and 80 + 80 MHz |
| | TBD | SIGB MCS | 3 | Indication the MCS of HE-SIG-B. Set to 0 for MCS0 Set to 1 for MCS1 Set to 2 for MCS2 Set to 3 for MCS3 Set to 4 for MCS4 Set to 5 for MCS5 |
| | TBD | SIGB DCM | 1 | Set to 1 indicates that the HE-SIG-B is modulated with dual sub-carrier modulation for the MCS. Set to 0 indicates that the HE-SIB-B is not modulated with dual sub-carrier modulation for the MCS. |
| | TBD | SIGB Number Of Symbols | 4 | Indciates the number of HE-SIG-B symbols. |
| | TBD | SIGB Compression | 1 | Set to 1 for full BW MU-MIMO. Set to 0 otherwise. |
| | TBD | Number of HE-LTF Symbols | 3 | Indicates the number of HE-LTF symbols. |
| | TBD | CP + LTF Size | 3 | To indicate the CP length and HE-LTF size, the current combinations are 1x HE-LTF + 0.8 μs, 2x HE-LTF + 0.8 μs, 2x HE-LTF + 1.6 μs and 4x HE-LTF + 3.2 μS. Other combinations are TBD. |
| | TBD | LPDC Extra Symbol | 1 | Indication of the presence of the extra OFDM symbol for LDPC. |
| | TBD | Packet Extension | 3 | The first two bits indicate the "a-factor" and the third bit indicates the PE-Disambiguity. |
| | TBD | CRC | 4 | CRC of bits 0-41 in HT-SIG-A. |
| | TBD | Tail | 6 | Used to terminate the trellis of the convolutional decoder. Set to 0. |

The HE-SIG-A field for an HE trigger-based PPDU contains the fields listed in Table 3.

TABLE 3

| Two Parts of HE-SIG-A | Bit | Field | Number of Bits | Description |
|---|---|---|---|---|
| TBD | TBD | Format | 1 | Set to 0 for an HE SU PPDU Set to 1 for an HE trigger-based PPDU |
|  | TBD | BSS Color | 6 | The BSS Color field is an identifier of the BSS |
|  | TBD | Spatial Reuse | TBD | TBD |
|  | TBD | TXOP Duration | TBD | Indicates the remaining time in the current TXOP. Details TBD. |
|  | TBD | Bandwidth | TBD | TBD |
|  | TBD | Reserved | TBD | TBD |
|  | TBD | CRC | 4 | CRC of bits 0-41 in HT-SIG-A. |
|  | TBD | Tail | 6 | Used to terminate the trellis of the convolutional decoder. Set to 0. |

As can be seen from the above, HE STA can determine whether the received HE PPDU is intra PPDU or inter PPDU based on BSS Color in HE SIG A.

The following can be an example of the format of SR parameter in HE-SIG A.

<4 Bit SR Field (for HE-SU)>

SR=0000: SR Disallow Flag, (under TBD restrictions, e.g, an SR transmission carrying this flag disallow further SR transmission. Avoiding excessive SR transmission)

0001<SRP<1111: SR parameter (if trigger frame, no SR transmission during trigger frame)

SR=1111: SR is disallowed during trigger frame duration (ref *), use Adjustment rule.

B. AID Assignment Rule

The AP may send a specific IE that includes a field 'N'. If the value indicated by the field N is greater than 0, then the AP shall allocate AIDs according to the following equation.

$$AID(8 - N + 1:8) = \\ bin[(dec(BCB(0:N - 1)) + dec(BSSID(47 - N + 1:47) \oplus \\ BSSID(43 - N + 1:43)))\mod 2^N, N] \quad \text{[Equation 2]}$$

The specific IE may contain the number of partial BSS color bits used and the partial BSS color bits.

C. VHT Frame Including SR Parameters

As explained above, HE STA can determine whether the received HE PPDU is intra PPDU or Inter PPDU based on BSS Color information of HE SIG A. Also, the HE STA can acquire BSS Color information from AID/Partial AID based on AID assignment rule above. HE STA can perform adaptive CCA and/or power control based on the SR parameters of HE SIG A in HE PPDU.

However, HE STA cannot determine whether VHT frame is intra PPDU or inter PPDU since VHT PPDU does not have SR parameter as explained with regards to FIG. 8.

So, in one embodiment of the present invention, a method for a STA to transmit a VHT frame including SR parameter is proposed. According to this method, the STA prepares a VHT frame including VHT SIG A, VHT SIG B and a service field, wherein one of the VHT SIG A, the VHT SIG B and the service field includes a subfield informing spatial reuse (SR) operation when the STA is capable to supporting HE (High Efficiency) WLAN (Wireless Local Area Network) scheme. For legacy STAs, they have no capability for SR operation, so they don't need to use the subfield informing SR operation.

The subfield informing SR operation can be is used for adaptive CCA operation and/or power control based on the determination that the VHT frame is from inter-BSS or intra-BSS.

Also, the one of the VHT SIG A, the VHT SIG B and the service field may include the subfield informing SR operation when the VHT frame is a downlink frame. For the uplink VHT frames, partial AID shall be set to partial BSSID, thus HE STA can determine whether this uplink VHT frame is for applying OBSS PD level or not.

<Examples using VHT SIG A>

Figures 9, 10:
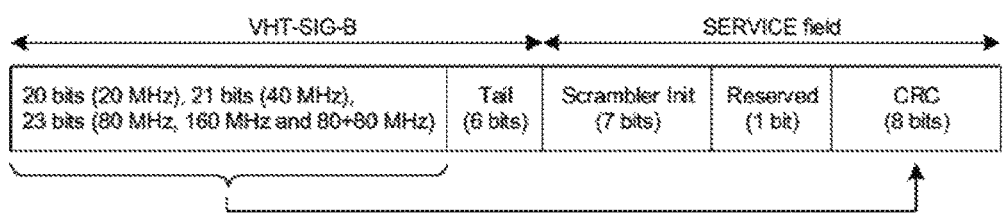
FIG. 9 is a diagram showing one example of VHT SIG A including SR parameter.
FIG. 10 shows VHT SIG B and SERVICE field relationship.

FIG. 9 is a diagram showing one example of VHT SIG A including SR parameter.

Specifically, FIG. 9 is for the case when the VHT SIG A includes the subfield informing SR operation with a length of 3 bits. Considering the reserved bits of legacy system, the 3 bits may be consisting of: a third bit (B2) and $24^{th}$ bit (B23) of VHT SIG A1, and a $10^{th}$ bit (B9) of VHT SIG A2.

Detailed SR parameters can be set as:

000=SR is disallowed

001~111: Are used as SR parameter (Information for adaptive CCA and power control)

In another example, VHT SIG A may include the subfield informing SR operation with a length of 2 bits. In this case, the 2 bits may be selected as two among: B2, B23 of VHT SIG A1 and B9 of BHT SIG A2.

Detailed SR parameters can be set as:

00=SR is disallowed 01, 10, 11: Are used as SR parameter (Information for adaptive CCA and power control)

In another example, VHT SIG A may include the subfield informing SR operation with a length of 1 bit. The 1 bit may be selected as one among: B2, B23 of VHT SIG A1 and B9 of BHT SIG A2.

wherein one of values of the subfield indicates SR operation is disallowed while the other value of the subfield indicates fixed SR parameter value.

Detailed SR parameters can be set as:

0=SR is disallowed

1=SR is allowed and the fixed SR parameter value is used (Information for adaptive CCA and power control)

<Examples using VHT SIG B>

SR parameters can be includes in VHT SIG B. In this case, the reserved field of VHT SIG B of VHT SU PPDU allocation can be used for SR parameter. All 0s value of SR parameter can indicate SR disallow, and the rest of the values can indicate respective SR values.

Other than the reserved field, other fields, such as, VHT SIG B length, VHT MCS, can be used for SR parameter. There can be indicator in VHT SIG A informing whether VHT SIG B include SR parameter or specific field is reused for SR parameter.

<Examples using SERVICE Field>

FIG. 10 shows VHT SIG B and SERVICE field relationship.

When the SR parameters are included in the SERVICE field, the whole scrambling initialization subfield (7 bits) or a part of it can be used for this. For example, first/las 4-7 bits of the scrambling initialization subfield can be used for SR parameters.

The indication on whether the scrambler initialization subfield is used for SR parameter can be made by a reserved field of SERVICE field or the reserved field of VHT SIG A.

Figure 11:
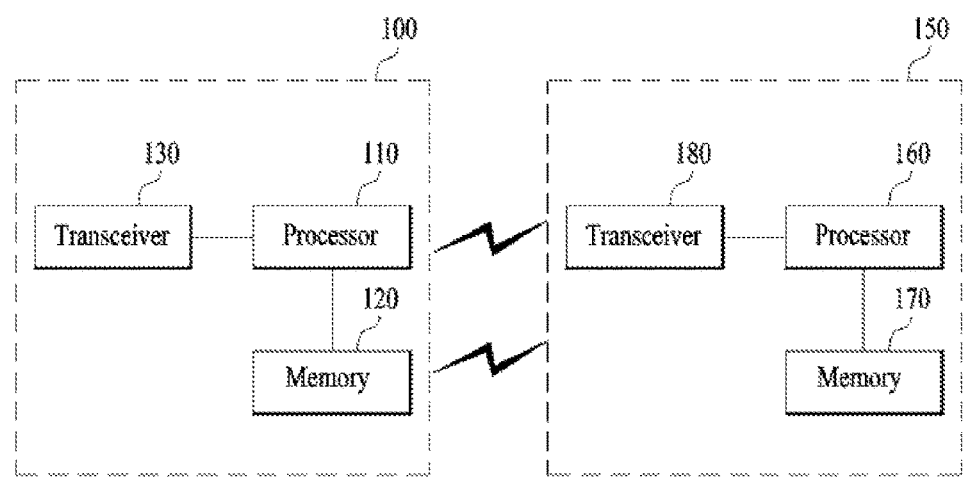
FIG. 11 is a block diagram of apparatuses for performing the above-described methods.

FIG. 11 is a block diagram of apparatuses for performing the above-described methods.

Referring to FIG. 11, a wireless apparatus 100 may be the afore-described specific STA, and a wireless apparatus 150 may be the afore-described AP.

The STA 100 may include a processor 110, a memory 120, and a transceiver 130. The AP 150 may include a processor 160, a memory 170, and a transceiver 180. The transceivers 130 and 180 may transmit and receive wireless signals and may be implemented in an IEEE 802.11/3GPP physical layer. The processors 110 and 160 may be implemented in the physical layer and/or the MAC layer and connected to the transceivers 130 and 180. The processors 110 and 160 may perform the forgoing SR operation.

The processors 110 and 160 and/or the transceivers 130 and 180 may include Application-Specific Integrated Circuit (ASICs), other chip sets, logic circuits, and/or data processors. The memories 120 and 170 may include Read Only Memories (ROMs), Random Access Memories (RAMs), flash memories, memory cards, storage media, and/or other storage units. If an embodiment is implemented in software, the above-described methods may be performed in a module (e.g., a process or a function) performing the afore-described functions. The module may be stored in the memories 120 and 160 and executed by the processors 110 and 160. The memories 120 and 170 may reside inside or outside the processors 110 and 160 and may be connected to the processors 110 and 160 by well-known means.

As is apparent from the foregoing description, control information can be efficiently transmitted in a multi-user radio frame.

While the present invention has been described above in the context of an IEEE 802.11 WLAN system, the present invention is not limited thereto. The present invention is applicable in the same manner to various wireless systems in which an AP may transmit a frame including control information for a plurality of STAs.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for a station (STA) for spatial reuse (SR) operation, the method comprising:
    preparing, at the STA, a VHT (Very High Throughput) frame including a VHT signaling (SIG) A, a VHT SIG B and a service field,
    wherein the VHT SIG A includes partial Association ID (partial AID) information,
    wherein one of the VHT SIG A, the VHT SIG B and the service field includes a subfield informing SR operation when the STA is capable to supporting HE (High Efficiency) WLAN (Wireless Local Area Network) scheme and when the VHT frame is a downlink frame, and
    wherein the partial AID information of the VHT SIG A is used for SR operation when the STA is capable to support HE WLAN scheme and when the VHT frame is an uplink frame; and
    transmitting the VHT frame to another STA,
    wherein, when the STA prepares a HE frame that is different from the VHT frame, the HE frame comprises a HE SIG A including BSS (Basic Service Set) color information for SR operation.

2. The method of claim 1, wherein the subfield informing SR operation is used for adaptive CCA (Clear Channel Assessment) operation or power control based on determination that the VHT frame is from inter-BSS or intra-BSS.

3. The method of claim 1, wherein the VHT SIG A includes the subfield informing SR operation with a length of 3 bits,
    wherein the 3 bits are consisting of:
        a third bit and $24^{th}$ bit of a first part of VHT SIG A (VHT SIG A1), and a $10^{th}$ bit of a second part of VHT-SIG A (VHT SIG A2), and
    wherein one of values of the subfield indicates SR operation is disallowed while the other values of the subfield indicates respective parameter values for SP operation.

4. The method of claim 1, wherein the VHT SIG A includes the subfield informing SR operation with a length of 2 bits,
    wherein the 2 bits are selected as two among:
        a third bit and $24^{th}$ bit of a first part of VHT SIG A (VHT SIG A1), and a1e bit of a second part of VHT-SIG A (VHT SIG A2), and
    wherein one of values of the subfield indicates SR operation is disallowed while the other values of the subfield indicates respective parameter values for SP operation.

5. The method of claim 1, wherein the VHT SIG A includes the subfield informing SR operation with a length of 1 bit,
    wherein the 1 bit is selected as one among:
        a third bit and $24^{th}$ bit of a first part of VHT SIG A (VHT SIG A1), and a $10^{th}$ bit of a second part of VHT-SIG A (VHT SIG A2), and
    wherein one of values of the subfield indicates SR operation is disallowed while the other value of the subfield indicates fixed SR parameter value.

6. The method of claim 1, wherein the VHT SIG B includes the subfield informing SR operation, and
    wherein one of values of the subfield indicates SR operation is disallowed while the other value or values of the subfield indicates SR parameter value.

7. The method of claim 6, wherein the VHT SIG A includes indicator informing whether the VHT SIG B includes the subfield informing SR operation.

8. The method of claim 1, wherein the service field includes the subfield informing SR operation, and
    wherein a part of the scrambling initialization subfield of the service is used for the subfield informing SR operation.

9. A station (STA) adapted for spatial reuse (SR) operation, the STA comprising:
    a processor configured to prepare a VHT (Very High Throughput) frame including a VHT signaling (SIG) A, a VHT SIG B and a service field,
    wherein the VHT SIG A includes partial Association ID (partial AID) information,
    wherein one of the VHT SIG A, the VHT SIG B and the service field includes a subfield informing SR operation when the STA is capable to supporting HE (High Efficiency) WLAN (Wireless Local Area Network) scheme and when the VHT frame is a downlink frame, and wherein the partial AID information of the VHT SIG A is used for SR operation when the STA is capable to support HE WLAN scheme and when the VHT frame is an uplink frame; and a transceiver configured to transmit the VHT frame to another STA, wherein, when the processor prepares a HE frame that is different from the VHT frame, the HE frame comprises a first signaling field (HE SIG A) including BSS (Basic Service Set) color information for SR operation.

10. The STA of claim 9, wherein the subfield informing SR operation is used for adaptive CCA (Clear Channel Assessment) operation or power control based on determination that the VHT frame is from inter-BSS or intra-BSS.

* * * * *